United States Patent [19]
Tio

[11] Patent Number: 5,964,142
[45] Date of Patent: Oct. 12, 1999

[54] COFFEE DISPENSING DEVICE

[75] Inventor: Franco Dal Tio, Conegliano Veneto, Italy

[73] Assignee: San Remo S.r.l., Mareno Di Piave, Italy

[21] Appl. No.: 09/184,051

[22] Filed: Nov. 2, 1998

[30]     Foreign Application Priority Data

Nov. 3, 1997 [IT] Italy ................................. TV97A0152

[51] Int. Cl.⁶ .................................................. A47J 31/34
[52] U.S. Cl. ...................................... 99/289 R; 99/302 P
[58] Field of Search ............................. 99/302 P, 289 R, 99/297, 286, 280, 287; 426/433

[56]             References Cited
U.S. PATENT DOCUMENTS 5,255,594  10/1993  Grossi ................................. 99/289 R X
5,259,296  11/1993  Mikael et al. ...................... 99/302 P X
5,471,910  12/1995  Sager ................................. 99/302 P X

FOREIGN PATENT DOCUMENTS 0 407 365   1/1991   European Pat. Off. .
2 409 032   6/1979   France .
2012 503    10/1970  Germany .
41 19 559   12/1991  Germany .

Primary Examiner—Reginald L. Alexander
Attorney, Agent, or Firm—Guido Modiano; Albert Josif

[57]                ABSTRACT

A coffee dispensing device which comprises a supporting structure for a filter basket, provided with a first channel for feeding hot water and with a second channel for the outflow of the coffee. The structure also supports a hydraulic piston whose stem actuates, in contrast with at least one flexible element, a body which is provided with a containment chamber for ground coffee or coffee in tablets. The body can move approximately transversely and axially with respect to the filter basket and is temporarily associable therewith.

18 Claims, 5 Drawing Sheets

INLET FOR PISTON LIFTING WATER

COFFEE DISPENSING DEVICE

BACKGROUND OF THE INVENTION

The present invention relates to a coffee dispensing device.

Machines for making espresso coffee are currently known which comprise, in addition to a conventional containment and covering structure, a vertically movable body provided with a chamber in which it is possible to arrange, usually by means of a small hopper arranged below an axially offset bean grinder, the ground coffee or coffee tablet.

Said body, provided with said chamber for the ground coffee, is then moved by means of a suitable motor and/or gearmotor connected to a cam, so as to position it at a suitable filter basket where the hot water is made to flow, affecting the ground coffee.

This conventional solution, however, suffers many drawbacks: the arrangement of the body in the machine and its vertical motion with respect to the supporting surface entails a first problem which is linked to the outflow of the ground coffee from the grinder, which is axially offset with respect to the body, to the adjacent containment chamber, owing to the known problems related to the ensilage of ground products, which worsen in the presence of any residual moisture.

A second drawback of the cited prior art is the fact that gears and motor drives are necessary which on the one hand increase the complexity of the structure of the machine and on the other hand require constant maintenance to avoid possible jammings and/or malfunctions.

Another drawback of the cited prior art is the fact that the ground coffee placed inside the chamber formed in the body is pressed against the filter basket by applying the same force every time, regardless of the amount of ground coffee placed in said chamber.

This leads to the possibility of obtaining a coffee in which the powder is excessively washed out or insufficiently affected by the flow of water; either way, a coffee is obtained having less than ideal organoleptic characteristics.

SUMMARY OF THE INVENTION

The aim of the present invention is to solve the above-mentioned problems, eliminating the drawbacks of the cited prior art and thus providing a device which allows to dispense coffee having chosen and optimum organoleptic characteristics even when the dose of ground coffee used varies.

Within the scope of this aim, an important object is to provide a device which allows to make the ground coffee flow in an optimum manner from the grinder into the chamber for containing said ground coffee.

Another important object is to provide a device which is structurally simple, free from malfunctions and does not require specific maintenance.

Another important object is to provide a device whose operation does not require the use of additional motors and/or gearmotors, thus allowing to also contain the bulk of the corresponding machine.

Another important object is to provide a device which allows quick and easy removal of the tablet of grounds produced after making coffee.

Another important object is to provide a device which is reliable and safe in use and has low manufacturing costs.

This aim, these objects and others which will become apparent hereinafter are achieved by a coffee dispensing device which is characterized in that it comprises a supporting structure for a filter basket, provided with a first channel for feeding hot water and with a second channel for the outflow of the coffee, and for a hydraulic piston whose stem actuates, in contrast with at least one flexible element, a body which is provided with a containment chamber for ground coffee or coffee in tablets or capsules which can move approximately transversely and axially with respect to said filter basket and is temporarily associable therewith.

Advantageously, extraction means are provided for the automatic extraction of said tablet or of the compressed coffee from said containment chamber.

BRIEF DESCRIPTION OF THE DRAWINGS

Further characteristics and advantages of the invention will become apparent from the following detailed description of a particular but not exclusive embodiment, illustrated only by way of non-limitative example in the accompanying drawings, wherein.

DESCRIPTION OF THE PREFERRED EMBODIMENTS

Figure 1:
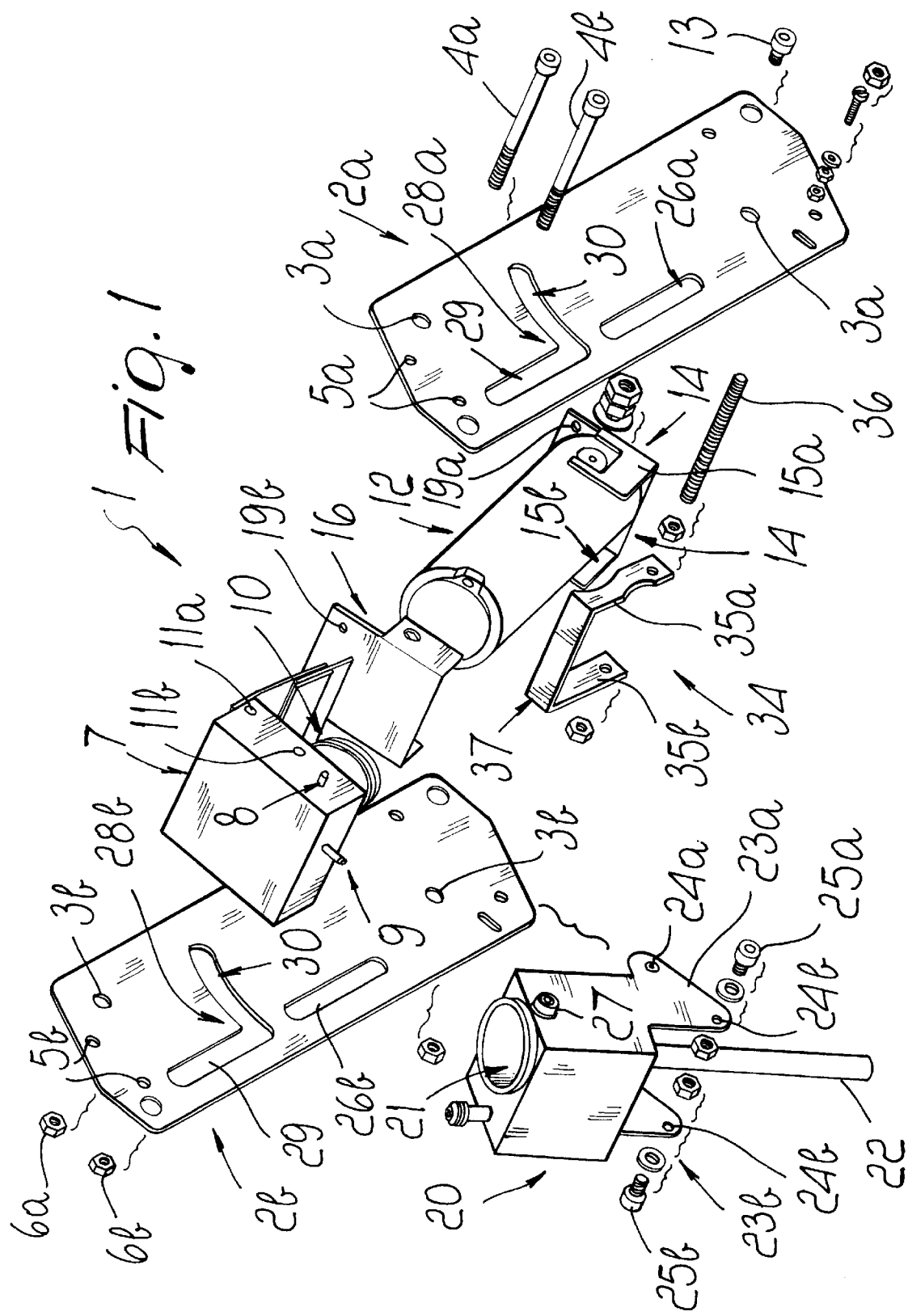
FIG. 1 is an exploded view of the components of the device.

With reference to the above figures, 1 designates a coffee dispensing device which comprises a supporting structure composed of a pair of lateral shoulders 2a and 2b which are mutually parallel and whereon there are provided first holes 3a and 3b for fixing, by means of suitable pins, to a structure which constitutes a machine which is accordingly provided as a whole, for example, with a suitable water pump, with a grinder for grinding the coffee beans into powder, and with any necessary electric power supplies, wiring, etcetera.

Said lateral shoulders 2a and 2b are kept mutually spaced and locked by means of a pair of first pins 4a and 4b which pass at second holes 5a and 5b and can be locked by means of suitable complementarily threaded first nuts 6a and 6b.

In the interspace between the lateral shoulders 2a and 2b it is possible to arrange, in an upward region, an assembly 7 which is constituted by a box-like body which has a first feed channel 8 for the hot water and a second channel 9 for the outflow of the coffee; both channels are connected to a filter basket 10.

Suitable third holes 11a and 11b for the passage of the first pins 4a and 4b are provided in said assembly 7.

A hydraulic piston 12 is further arranged in the interspace between the lateral shoulders 2a and 2b and can be supplied with the same pump water required to obtain the coffee.

Said hydraulic piston 12 is also associated, by means of second pins 13, with the lateral shoulders 2a and 2b and rests at the base of a first bracket 14 which is provided with first wings 15a and 15b between which the hydraulic piston is arranged.

At the opposite end with respect to the first bracket 14 a second bracket 16 is provided which is associated at the tip of the stem 17.

The first bracket and the second bracket are mutually connected by means of at least one flexible element, such as a first spring 18 which is rigidly coupled, at its ends, to said first and second brackets at suitable fourth holes 19a and 19b.

The hydraulic piston 12 is arranged at the ends of the lateral shoulders 2a and 2b that are opposite to the ones with which the assembly 7 is associated, and is associated with said shoulders and axially offset with respect to the filter basket 10; the hydraulic piston 12, however, is inclined so that the stem 17 is directed toward said filter basket 10.

Moreover, the device is constituted by a body, generally designated by the reference numeral 20, which can be interposed between the lateral shoulders 2a and 2b and has a containment chamber 21 for ground coffee powder or for a tablet or a capsule. Said body 20 is provided, in a downward region, with a rod 22 which lies axially with respect to the chamber 21.

Said body 20 is laterally provided with a pair of tabs 23a and 23b which have suitable pairs of fifth holes 24a and 24b respectively acting as seats for connection to said adjacent second bracket 16 and to a pair of first sliders 25a and 25b.

Said sliders can be arranged at a pair of first longitudinal guides 26a and 26b, which are formed on said lateral shoulders 2a and 2b and allow an axial movement of said body 20 along said lateral shoulders.

Suitable second sliders 27 are further provided to protrude, along the same axis, laterally to the body 20 and are accommodated at second guides 28a and 28b which are formed at the lateral shoulders 2a and 2b; each guide has a first portion 29 which lies above, and has the same axis as, the first longitudinal guides 26a and 26b and is connected, at a region that lies above the upper end of said first longitudinal guides 26a and 26b, to a second portion 30 which is slightly curved toward the stem 17 of the hydraulic piston 12.

The rod 22 of the body 20 is associated, in an upward region, at a plate 31 which is slidingly associated within the chamber 21 of said body 20; said rod 22 can therefore perform an axial movement with respect to said chamber in contrast with a flexible element such as a second spring 32 which is rigidly coupled, at one end, to said rod and abuts, with its other end, against the lower surface 33 of the body 20.

The device is further constituted by additional extraction means for automatically extracting said tablet or the compressed coffee from the chamber 21 and the body 20; said means are constituted by a third bracket 34 which is C-shaped and whose second wings 35a and 35b are pivoted, at their ends, by means of a suitable third pivot 36, to the lateral shoulders 2a and 2b in a region located below the first longitudinal guides 26a and 26b.

Said third bracket 34 further has a base 37 which is directed toward said first longitudinal guides and can be made to oscillate in the opposite direction with respect to the adjacent hydraulic piston 12; said base 37 interacts with a third spring 38, which is rigidly coupled, at its other end, at a fourth pivot 39 which is associated with one of the shoulders 2a and 2b.

Figure 2:
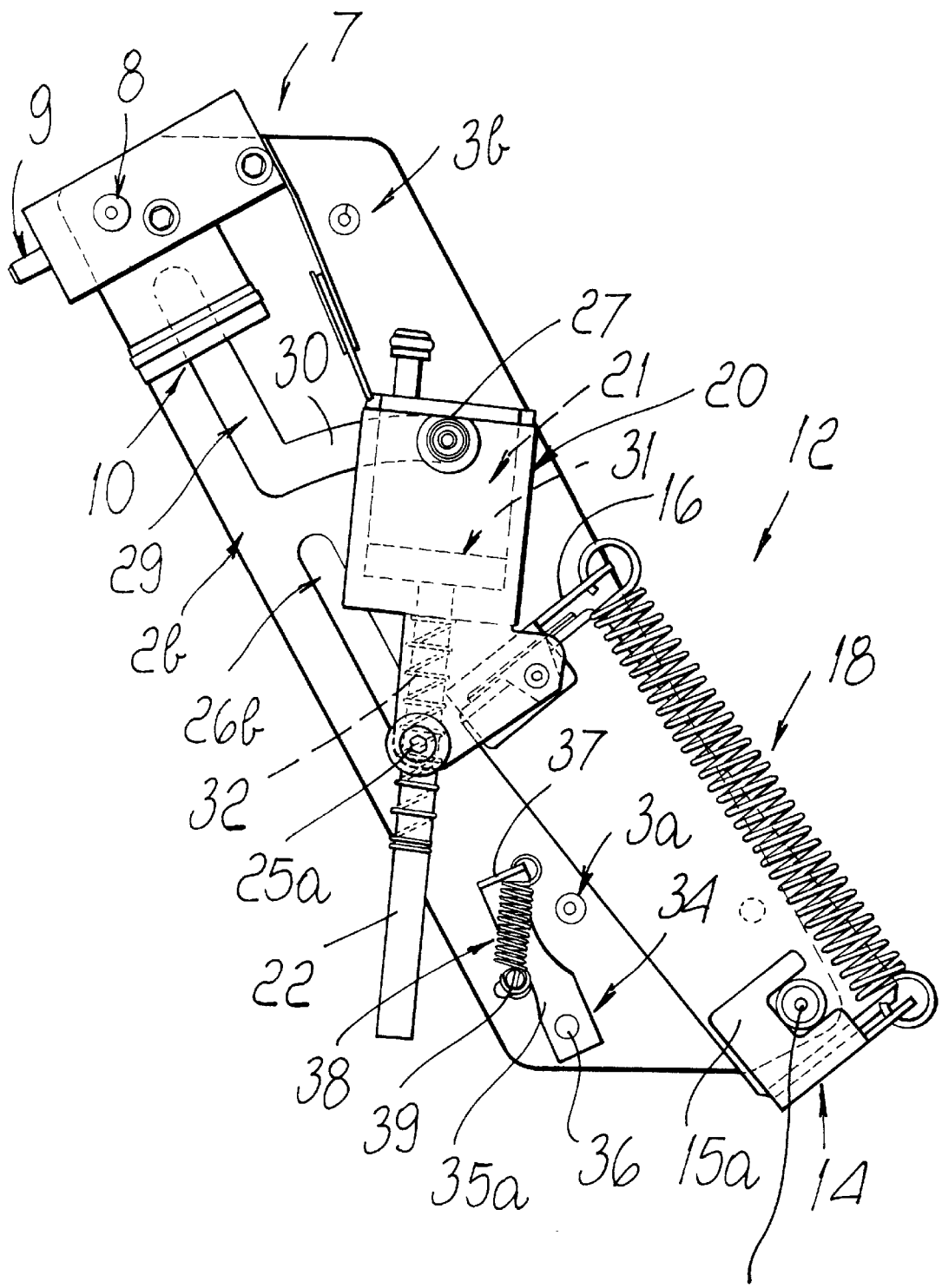
FIGS. 2, 3, 4 and 5 are partially sectional side views of the device in different operational steps.

The operation of the device is as follows: initially, as shown in FIG. 2, the hydraulic piston 12 is arranged in the inactive position.

Owing to the connection of the stem 17 of said piston to the tabs 23a and 23b of the body 20, said body is arranged so that the first sliders 25a and 25b lie at the lower end of the first longitudinal guides 26a and 26b and simultaneously the second sliders 27 lie at the very end of the second portion 30.

This arrangement, shown in FIG. 1, assuming that the lateral shoulders 2a and 2b are arranged at an angle with respect to the machine supporting surface, arranges the body 20 in a vertical position, for example in a region that lies underneath an adapted grinder, which can thus directly discharge the ground coffee in powder form into the chamber 21 by gravity or allow the tablet to drop.

Figure 3:
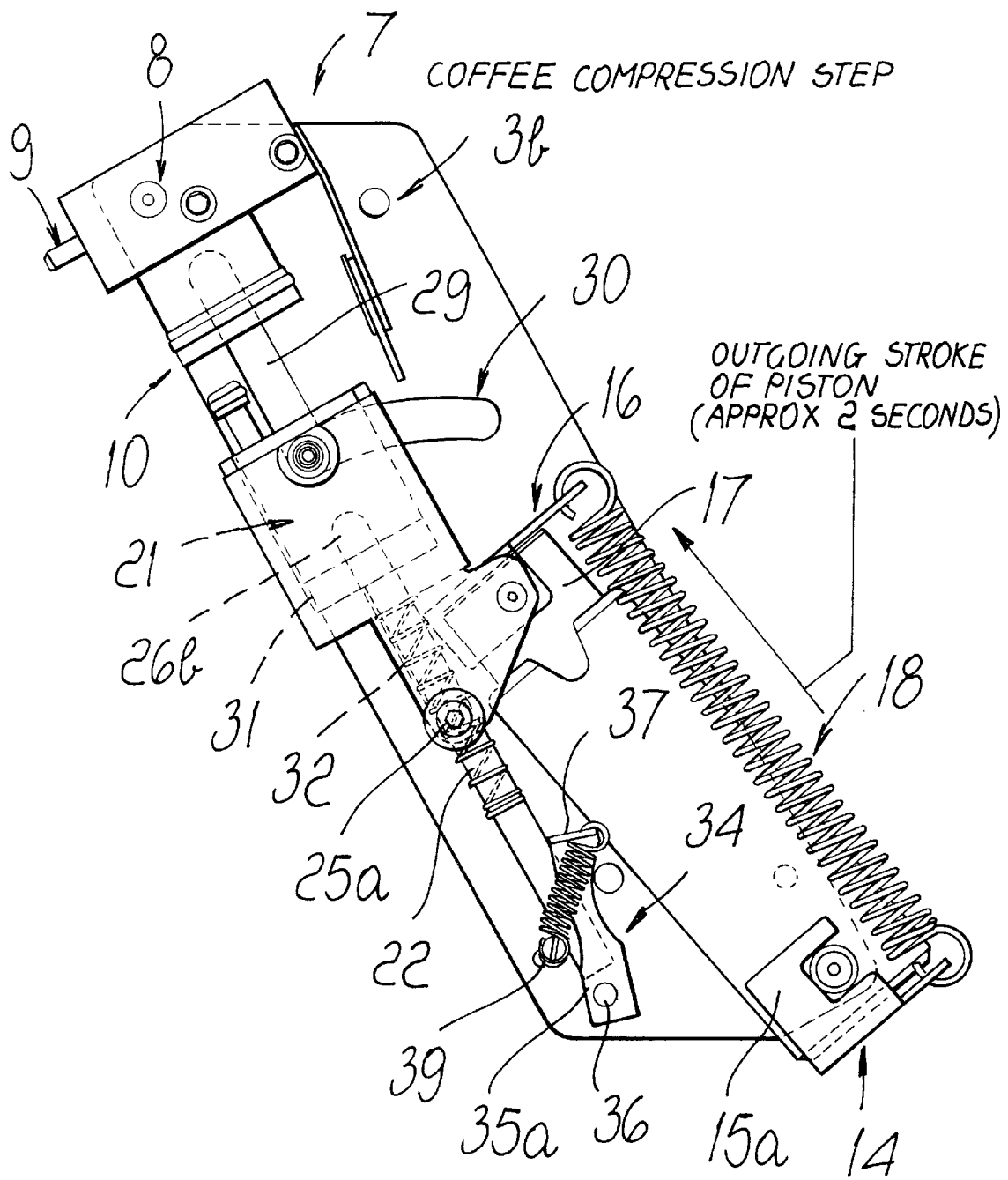

Then, as shown in FIG. 3, the hydraulic piston 12 is activated and, due to the presence of the first and second sliders, produces a rotation and a slight rise of the body 20 until it reaches the region that connects the first portion 29 and the second portion 30: a subsequent elongation of the stem moves the body 20 so that it interacts with the filter basket 10, thus tamping the powder, which can be pressed with a pressure which is preset to values deemed suitable according to the amount of powder or to the thickness of the tablet contained in the chamber 21, thus improving the organoleptic qualities of the resulting coffee.

This allows to obtain, without particular adjustments which are wasteful in terms of time or coffee, one or two or more coffees which have optimum organoleptic characteristics.

Figure 4:
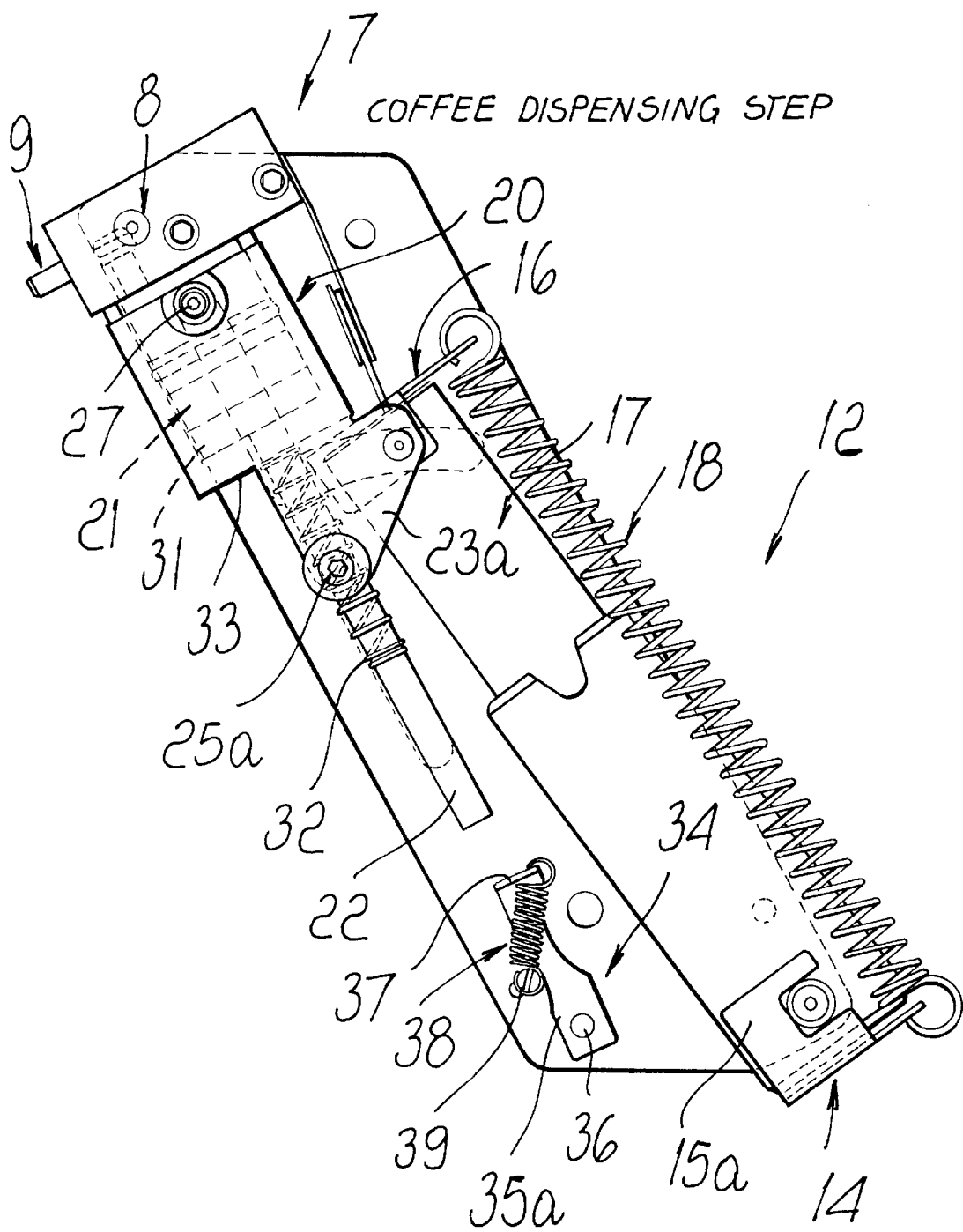

At this point, shown in FIG. 4, it is possible to activate the feeding of the hot water to produce the coffee.

Figure 5:
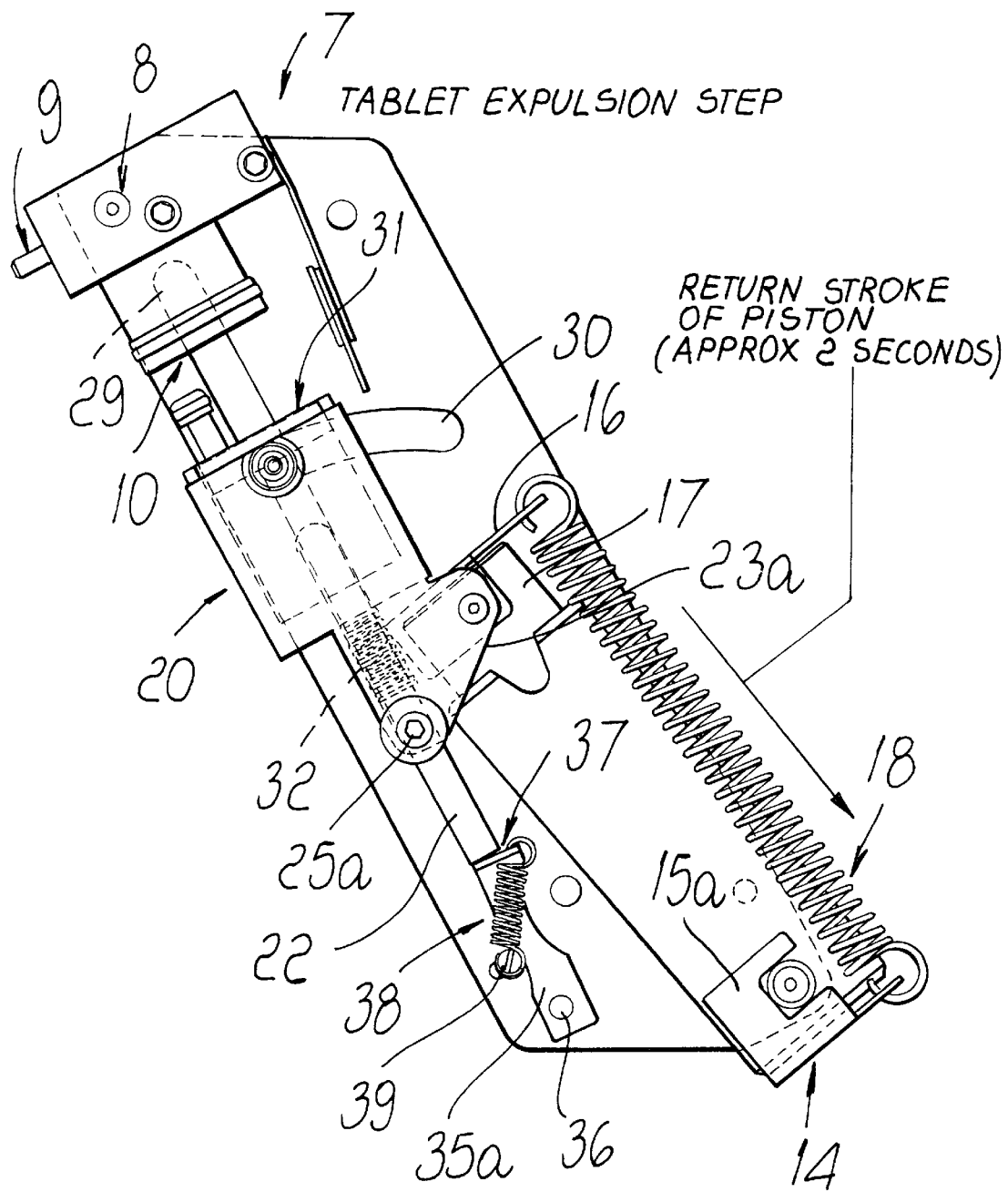

Then the retraction of the stem 17 of the hydraulic piston 12 is actuated and the body 20 therefore moves downward until the tip of the rod 22 abuts against the underlying base 37 of the third bracket 34, as shown in FIG. 5.

In this manner, the subsequent lowering of the stem 17 entails the lowering of the body 20, consequently loading the second spring 32, while the rod 22 and therefore the plate 31 are motionless.

The dimensions of the components are chosen so that an intended lowering of the stem 17 and of the hydraulic piston 12 is matched by the arrangement of the plate 31 at the tip of the body 20, thus allowing automatic expulsion of the tablet or of the grounds of the coffee previously contained in the chamber 21.

In this condition, shown in FIG. 5, the second sliders 27 are arranged in the region that connects the first portion 29 and the second portion 30; a subsequent lowering of the stem 17 forces a rotation of the body 20 and therefore of the rod 22, which no longer interacts with the base 37 of the third bracket 34.

In this case, the second spring 32 repositions the plate 31 on the bottom of the chamber 21 and the cycle can start over again, since the position is the one shown in FIG. 2.

It has thus been observed that the invention has achieved the intended aim and objects, a device having been provided which allows to dispense coffee having chosen and optimum organoleptic characteristics even when the dose of ground coffee used varies, by virtue of the possibility to preset the thrust of the piston as a function of the volume of coffee placed in the chamber.

Moreover, since the chamber is arranged below the grinder, it is possible to make the ground coffee flow out in an optimum manner; the structural simplicity of the device, which operates by using the pump that is already used to feed the hot water, also allows to make it immune to malfunctions and specific maintenance, at the same time containing the bulk of the corresponding machine with which it is to be associated.

Finally, it is possible to make it easier for the user to obtain the coffee, since the tablet or the compressed grounds produced after coffee has been made can be removed quickly and easily.

The use of particular tablets or capsules can allow to obtain, for example, infusions or teas or other hot beverages.

The invention is of course susceptible of numerous modifications and variations, all of which are within the scope of the same inventive concept.

The materials and the dimensions that constitute the individual components of the device may also of course be the most pertinent according to the specific requirements.

The disclosures in Italian Patent Application No. TV97A000152 from which this application claims priority are incorporated herein by reference.

What is claimed is:

1. In a coffee making machine, a dispensing device comprising: a supporting structure; a filter basket, provided with a first channel for hot water feeding and with a second channel for brew outflow; a hydraulic piston; a body which is provided with a containment chamber for containing a brewing product, said filter basket, said piston and said body being supported at said supporting structure; a stem of said piston; and a first flexible element, said stem driving, by acting in contrast with said flexible element, said body for movement thereof along a path extending substantially transversely and further axially with respect to said filter basket, and said body being, during said movement thereof along said path, temporarily associable with said filter basket.

2. The device of claim 1, comprising extraction means for automatic extraction of said brewing product from said containment chamber.

3. The device of claim 1, wherein the machine comprises a frame structure thereof, a water pump and a coffee grinder, and wherein said supporting structure comprises: a pair of lateral shoulders which are parallel to each other so as to define an interspace therebetween; first fixing holes; and fixing pins, adapted to pass through said first holes to fix said shoulders to said frame structure of the machine.

4. The device of claim 3, further comprising: a pair of first pins; second holes through which said first pins are insertable; threaded first nuts coupleable with said first pins for securing said lateral shoulders in a mutually spaced relationship; and an assembly being arrangeable in the interspace between said lateral shoulders, in an upward region thereof, said assembly being constituted by a box-like body on which said first feeding channel for the hot water and said second channel for brew outflow are located, said first and second channels being connected in fluid communication to said filter basket.

5. The device of claim 4, comprising third holes which are formed in said assembly for allowing passage of said first pins, and wherein said piston is arranged in said interspace between said lateral shoulders and is actuated by an actuation fluid, said actuation fluid being selectable to be water provided by said pump.

6. The device of claim 5, comprising: second pins, and a first and a second bracket; said first bracket being provided with a base and first wings between which a first end of said hydraulic piston is arranged, said hydraulic piston being associated, by way of said second pins, with said lateral shoulders so as to rest with said first end at the base of said first bracket, said second bracket being provided at a second opposite end of said piston and being associated at a tip end of said stem.

7. The device of claim 6, wherein said first and second brackets are mutually connected by way of said first flexible element which comprises a first spring, said first spring being coupled, at opposite ends thereof, to fourth holes provided at each of said first and second brackets.

8. The device of claim 7, wherein said hydraulic piston is arranged between lower ends of said lateral shoulders that are opposite to ends located at said upward region at which said assembly is associated, said piston being associated with said shoulders and axially offset with respect to said filter basket, said hydraulic piston being inclined so that said stem is directed toward said filter basket.

9. The device of claim 8, wherein said body is interposable between said lateral shoulders, and is provided in a downward region thereof with a rod which is axially slidingly associated with said containment chamber, said body being further laterally provided with two tabs, said tabs having a pair of first sliders and a corresponding pair of fifth holes, said fifth holes respectively acting as seats for connection to said second bracket and to said pair of first sliders.

10. The device of claim 9, comprising: a pair of first longitudinal guides for said first sliders which are formed on said lateral shoulders and allow an axial movement of said first sliders therealong; second sliders protruding along a same axis thereof, laterally from said body; and second guides formed at said lateral shoulders in which said second sliders are accomodated for movement therealong.

11. The device of claim 10, wherein each one of said second guides has a first longitudinal portion extending above, and along a same longitudinal axis as said first longitudinal guides, each said first longitudinal portion being connected, in a region that lies above an upper end of said first longitudinal guides, to a second substantially transversal portion of said second guides which is slightly curved toward said stem of said hydraulic piston.

12. The device of claim 11, comprising: a second flexible element; and a plate which is slidingly associated within said containment chamber of said body, said rod being associated in an upward region thereof to said plate and being able to perform an axial movement with respect to said containment chamber in contrast with said second flexible element, said second flexible element comprising a second spring which is coupled, at one end thereof, to said rod and abuts, with a second opposite end thereof, against a lower surface of said body.

13. The device of claim 11, wherein said extraction means are constituted by a third pivot and by a third C-shaped bracket, said third bracket comprising second wings which are pivoted, at ends thereof, by way of said third pivot, to said lateral shoulders in a region that lies below said first longitudinal guides.

14. The device of claim 13, comprising a third spring and a fourth pivot, and wherein said third bracket has a base which is directed toward said first longitudinal guides, said base of the third bracket being movable, so as to oscillate in a direction away from said hydraulic piston, the base of said third bracket further interacting with an end of said third spring, which third spring is coupled, at an opposite end thereof, at said fourth pivot, and said fourth pivot being associated with one of said lateral shoulders.

15. The device of claim 14, wherein said body and said piston are operatively connected so that said body performs, upon movement along said path defined by way of said first and second guides, a first substantially oscillating movement and a further second linear movement, said first and second movements providing transfer of the body from a substantially vertical position, below said grinder, to a position for including said filter basket in said containment chamber.

16. The device of claim 15, wherein said first and second movements are reversible.

17. The device of claim 16, wherein said movements comprise: a retraction of said stem starting from a condition in which the filter basket is associated with said containment chamber; a first downward motion of said body matching said stem retraction until the tip end of said rod abuts against said underlying base of said third bracket; and a subsequent lowering of said stem forcing a second lowering of said body and a loading of said second spring, with said rod remaining eventually blocked.

18. The device of claim 17, wherein said rod and said third bracket and said stem are provided with dimensions such that a chosen lowering of said stem leads to an arrangement of said plate at a tip part of said body for causing automatic expulsion of the brewing product previously contained in said containment chamber.

* * * * *

UNITED STATES PATENT AND TRADEMARK OFFICE
CERTIFICATE OF CORRECTION

PATENT NO. : 5,964,142
DATED : October 12, 1999
INVENTOR(S) : DAL TIO, Franco

It is certified that error appears in the above-identified patent and that said Letters Patent is hereby corrected as shown below:

Title page, item [19] should read -- Dal Tio --

Signed and Sealed this

Seventeenth Day of October, 2000

Attest:

Q. TODD DICKINSON

*Attesting Officer*   *Director of Patents and Trademarks*